March 31, 1931. O. PETERS 1,799,023
MEMBRANE DECANTING SIPHON WITH DEVICE
FOR PROTECTION OF RUBBER MEMBRANES
Filed June 7, 1928 2 Sheets-Sheet 1
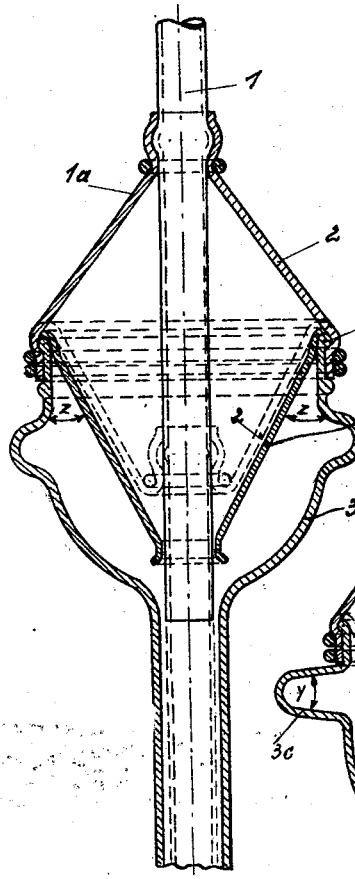
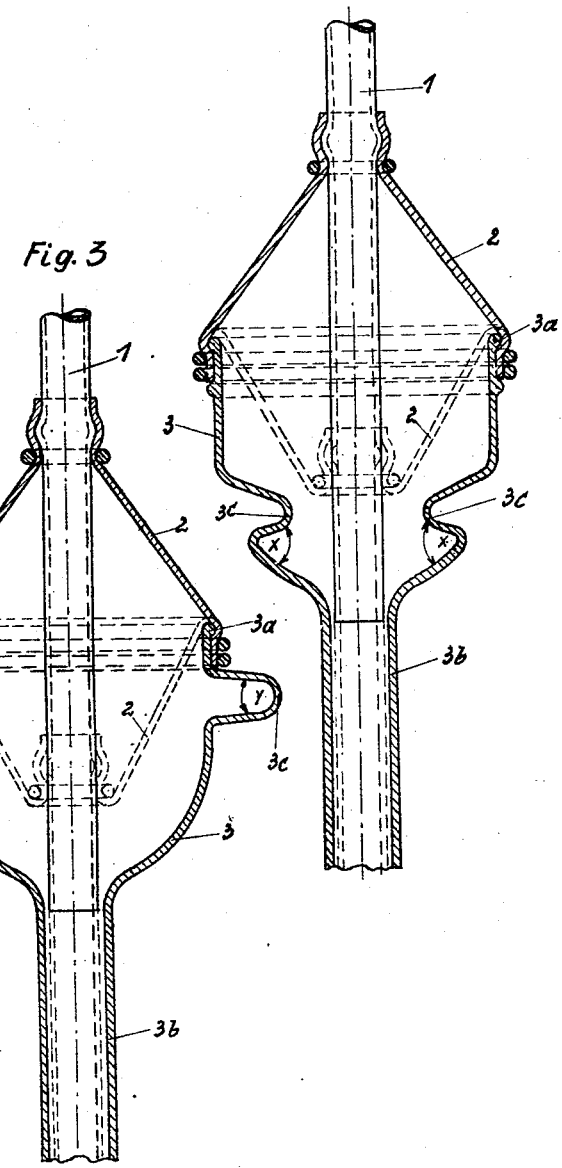
Inventor:

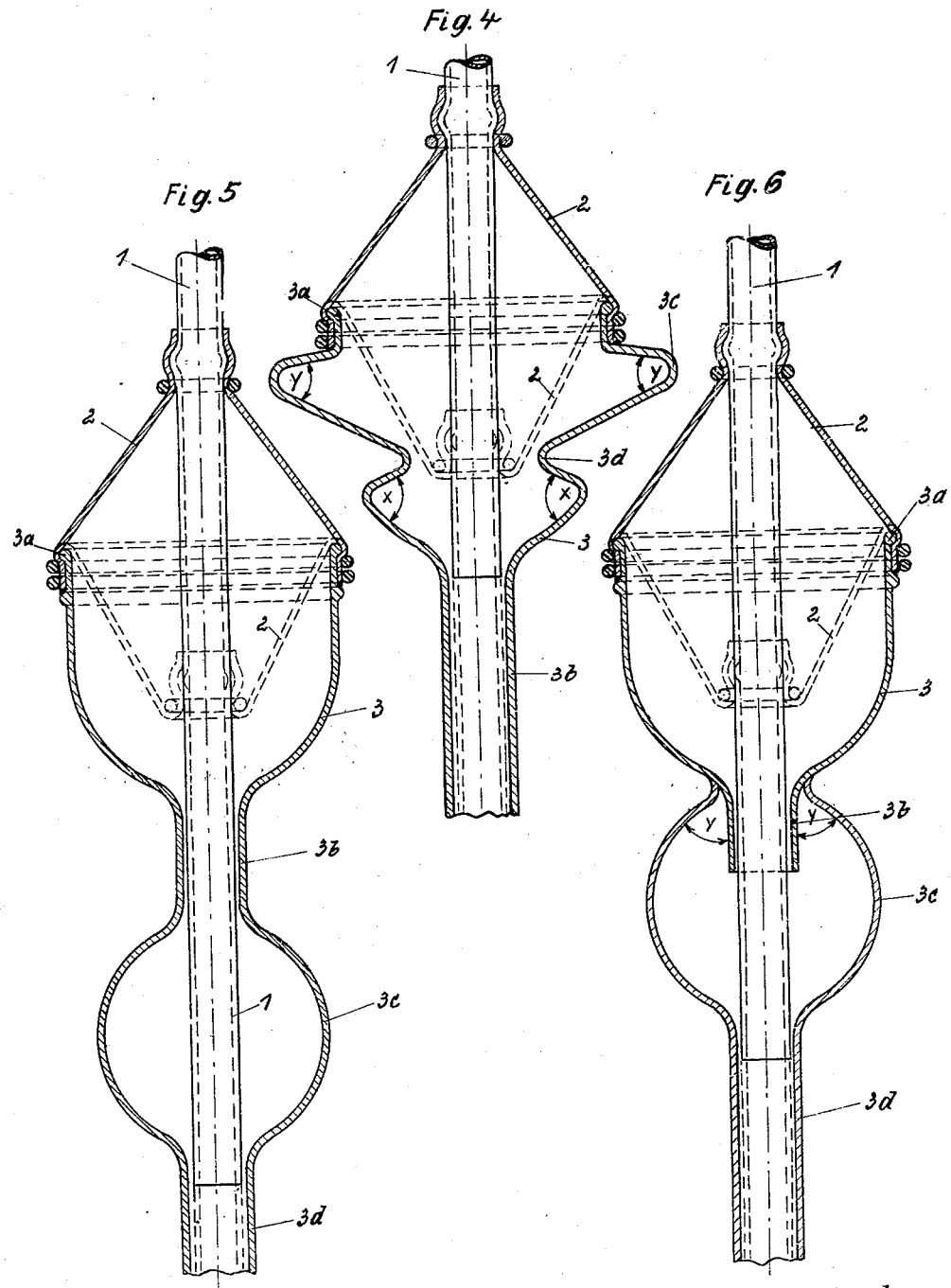

Patented Mar. 31, 1931

1,799,023

UNITED STATES PATENT OFFICE

OSCAR PETERS, OF CHEMNITZ, GERMANY

MEMBRANE DECANTING SIPHON WITH DEVICE FOR PROTECTION OF RUBBER MEMBRANES

Application filed June 7, 1928. Serial No. 283,684.

This invention refers to arrangements of membrane siphons for protection of membrane with the intention to improve the durability, utility and effect of the membrane considerably.

The rubber membrane of all membrane siphons, snapping up automatically or tied on top of the goblet-like or funnel-shaped lower part was entirely unprotected in all the systems known hitherto and being exposed to the influence of the fluids to be decanted, as acids, lyes, oils, etc. No means were provided for the protection of the rubber membranes against the contact of the fluid as soon as the siphon was placed horizontally or transversely on the ground, or when it was held upside down. To remove these drawbacks and, by doing so, to produce a siphon of such a practical shape that it can be used unhesitatingly for any kind of fluid by any layman, is the intention and purpose of the present invention.

Experience teaches us that small or big parts of the fluid always remain in the siphon, in the upper or lower part, after it has been used, and that a few drops of a corrosive fluid are sufficient to produce a slow destruction of the rubber membrane by touching said membrane.

Besides that, the following practical case must be taken into consideration: The vacuum produced by the squeezing and expanding of the rubber membrane is always the same, but the level of the fluid to be decanted from the vessel varies greatly; therefore it may happen that the produced vacuum is too much owing to the high level of the fluid in the vessel, and the fluid, while passing through the siphon, is pressing into the funnel.

Naturally a fluid, standing at a more or less high level in the funnel, must touch the rubber membrane at the inside when the siphon is in a horizontal position or even in a considerably sloping position.

Both of these disadvantages have been rather keenly felt in practice and are removed in the present invention, and, by a more or less combined narrowing or expansion of the funnel in its upper or lower part, the siphon gets the real, practical effect which circumstances demand.

With reference to the illustration Figure 1 shows the suction tube of a siphon in cross section in which the goblet-like upper part contains a kind of funnel 4 which is firmly fixed to the upper part $3^a$ of goblet 3.

According to whether funnel 4 projects only a little into the funnel space or, as shown in the drawing, reaches pipe 1, greater or smaller quantities of fluids can be retained even when the apparatus is held upside down, and no fluids can ever touch the membrane 2.

Figure 2 shows the suction part of a siphon in cross section in which the funnel 4 has been omitted and, as substitute, goblet 3 contains one or several grooves bulging outwards $3^c$. In the hollow spaces formed in this way under each groove remaining parts of fluid are collected. Even in case such a siphon is laid down after use, no fluid whatever can reach the rubber membrane.

Figure 3 shows the suction tube of a siphon in cross section in which the funnel 4 also has been omitted and instead of it goblet 3 contains one or several more or less deep grooves bulging outwards $3^c$. In the hollow spaces formed in this way under each groove the remaining parts of fluid are collected. In this case also no fluid whatever can touch the membrane.

Figure 4 shows the suction tube of a siphon in cross section in which the funnel 4 also has been omitted, and in place of it goblet 3 contains not only grooves $3^c$ but also indentations $3^d$ bulging inwards, i. e. a combination of disposition of parts of Figures 2 and 3. In this arrangement the hollow spaces $x$ and $y$ can retain fluid even more effectively than in Figures 2 and 3, so that in this case also no fluid can ever touch the membrane when the siphon is put down after use.

Figure 5 shows the suction tube of a siphon in cross section in which the funnel arrangement 4 is also omitted, and instead of this the lower part of the goblet i. e. the goblet pipe $3^b$ to $3^d$ receives an expansion ($3^c$) of any form e. g. cylindrical or ball-shaped. This permits whatever shape be selected, for the hollow space 3ᶜ, to admit very large quantities of fluids, and not only remnants, without giving the fluid an opportunity of touching the membrane when the siphon is put down.

Figure 6 shows the suction tube of a siphon in cross section, in which the funnel arrangement 4 is also omitted, and the expansion of the goblet pipe 3ᶜ of goblet pipe 3ᵇ has been cut off and moved near the goblet pipe or the goblet itself somewhat above said pipe, so that part 3ᵇ of the goblet pipe projects somewhat into the expansion 3ᶜ. By this means alone, more or less considerable quantities can be efficaciously prevented from touching the rubber membrane, but the siphon can also be held upside down after use, hollow space Y catching in an absolutely reliable way even large quantities of remaining fluids.

Having duly described my invention in the aforesaid, what I claim is this:

1. Pneumatic membrane decanting siphon comprising, in combination, an elongated vacuum container bulging in its upper portion, a funnel extending into the said upper portion, a rubber hood adapted to be pressed into the said upper portion of the said vacuum container and to act as siphon membrane, the said rubber membrane being firmly connected with the upper edge of the vacuum container, a special siphon tube projecting through the rubber hood on both sides thereof and being firmly connected therewith and one or more annular reservoirs provided in the form of recesses in the base of the wall of the vacuum container behind the opening of the siphon tube projecting into the vacuum container to collect the residual liquid, the residual liquid collecting in the said reservoirs when the siphon is brought into slanting position while not in use.

2. Pneumatic membrane decanting siphon comprising, in combination, an elongated vacuum container bulging in its upper part, a rubber hood adapted to be pressed into the upper portion of the said vacuum container and to act as siphon membrane, the said rubber membrane being firmly connected with the upper edge of the vacuum container, a special siphon tube projecting through the rubber hood on both sides thereof and being firmly connected therewith, and one or more separate reservoirs provided in the form of recesses in the base of the wall of the vacuum container behind the opening of the siphon tube projecting into the vacuum container to collect residual liquid, the residual liquid collecting in the said reservoirs when the siphon is brought into slanting position while not in use.

3. Pneumatic membrane decanting siphon comprising, in combination, an elongated vacuum container bulging in its upper part, a rubber hood adapted to be pressed into the upper portion of the said vacuum container and to act as siphon membrane, the said rubber membrane being firmly connected with the upper edge of the vacuum container, a special siphon tube projecting through the rubber hood on both sides thereof and being firmly connected therewith, and one or more separate reservoirs provided in the form of annular recesses in the base of the wall of the vacuum container behind the opening of the siphon tube projecting into the vacuum container to collect residual liquid, the residual liquid collecting in the said reservoirs when the siphon is brought into slanting position while not in use.

Signed at Chemnitz, in the State of Saxony, Germany, this 24th day of May, 1928.

OSCAR PETERS.